US012651023B2

(12) United States Patent
Yan et al.

(10) Patent No.: US 12,651,023 B2
(45) Date of Patent: Jun. 9, 2026

(54) VIDEO EDITING TEMPLATE SEARCH METHOD AND APPARATUS, ELECTRONIC DEVICE AND STORAGE MEDIUM

(71) Applicant: Beijing Zitiao Network Technology Co., Ltd., Beijing (CN)

(72) Inventors: Ying Yan, Beijing (CN); Ping Li, Beijing (CN); Hu Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/573,281

(22) PCT Filed: May 9, 2023

(86) PCT No.: PCT/CN2023/092955
§ 371 (c)(1),
(2) Date: Dec. 21, 2023

(87) PCT Pub. No.: WO2023/217122
PCT Pub. Date: Nov. 16, 2023

(65) Prior Publication Data
US 2024/0320266 A1 Sep. 26, 2024

(30) Foreign Application Priority Data
May 10, 2022 (CN) .......................... 202210507537.1

(51) Int. Cl.
*G06F 16/738* (2019.01)
*G06F 16/78* (2019.01)
(Continued)

(52) U.S. Cl.
CPC ........ *G06F 16/7867* (2019.01); *G06F 16/738* (2019.01); *H04N 21/232* (2013.01); *H04N 21/4318* (2013.01); *H04N 21/8113* (2013.01)

(58) Field of Classification Search
CPC . G06F 16/7867; G06F 16/738; H04N 21/232; H04N 21/4318; H04N 21/8113
See application file for complete search history.

(56) References Cited

U.S. PATENT DOCUMENTS 12,293,778 B2    5/2025 Bian et al.
2007/0101387 A1*  5/2007 Hua ................... H04N 21/4828
725/112
(Continued)

FOREIGN PATENT DOCUMENTS

CN    111611492 A    9/2020
CN    112199524 A    1/2021
(Continued)

OTHER PUBLICATIONS

Jokela, Tero, Minna Karukka, and Kaj Mäkelä. "Mobile video editor: design and evaluation." Human-Computer Interaction. Interaction Platforms and Techniques: 12th International Conference, HCI International 2007, Beijing, China, Jul. 22-27, 2007, Proceedings, Part II 12. Springer Berlin Heidelberg (Year: 2007).*
(Continued)

*Primary Examiner* — Mohsen Almani

(57) ABSTRACT

The invention relate to video editing template search method, apparatus, electronic device and storage medium, wherein the method can acquire a search keyword input by a user, perform matching according to the search keyword to obtain a target music and a first template video; wherein the target music matches with the search keyword, the first template video is video edited by using a first editing template, and then present the user the first template video and the target music aggregately in a search result page in the form of card.

17 Claims, 5 Drawing Sheets

(51) Int. Cl.
 *H04N 21/232* (2011.01)
 *H04N 21/431* (2011.01)
 *H04N 21/81* (2011.01)

(56) References Cited

U.S. PATENT DOCUMENTS

| | | | | |
|---|---|---|---|---|
| 2007/0156524 A1* | 7/2007 | Grouf | ............... | G06Q 30/0264 |
| | | | | 705/14.73 |
| 2007/0248313 A1* | 10/2007 | Kageyama | .......... | G11B 27/034 |
| | | | | 386/281 |
| 2010/0023863 A1* | 1/2010 | Cohen-Martin | ... | G06Q 30/0601 |
| | | | | 705/26.1 |
| 2012/0323897 A1 | 12/2012 | Daher et al. | | |
| 2017/0193280 A1* | 7/2017 | Huang | ................. | G06F 16/784 |
| 2018/0330756 A1* | 11/2018 | MacDonald | .......... | G06F 16/951 |
| 2022/0130427 A1* | 4/2022 | Allibhai | ................. | G10L 25/57 |
| 2023/0368817 A1 | 11/2023 | Mo | | |

FOREIGN PATENT DOCUMENTS

| | | |
|---|---|---|
| CN | 112445395 A | 3/2021 |
| CN | 112689189 A | 4/2021 |
| CN | 113094522 A | 7/2021 |
| CN | 113094552 A | 7/2021 |
| CN | 113115099 A | 7/2021 |
| CN | 113542610 A | 10/2021 |
| CN | 114329223 A | 4/2022 |
| JP | 59-003187 B1 | 4/2016 |
| JP | 2024-502664 A | 1/2024 |
| JP | 7678157 B2 | 5/2025 |

OTHER PUBLICATIONS

Casares, Juan, et al. "Simplifying video editing using metadata." Proceedings of the 4th conference on Designing interactive systems: processes, practices, methods, and techniques. 2002. (Year: 2002).*
Annotated CN114329223A, Jan. 4, 2022 (Year: 2022).*
Kocks et al, WO2014004471A1, Jun. 25, 2013 (Year: 2013).*
International Search Report and Written Opinion received for PCT Patent Application No. PCT/CN23/092955, mailed on Jul. 26, 2023, 9 pages (2 pages of English Translation and 7 pages of Original Document).
Communication pursuant to Rules 70(2) and 70a(2) EPC for European Application No. 23802891.4, mailed Oct. 22, 2024, 1 page.
Extended European Search Report for European Application No. 23802891.4, mailed Oct. 2, 2024, 8 pages.
Notice of Reasons for Refusal for Japanese Patent Application No. 2023-578888 dated Oct. 15, 2024, 8 pages.
European Search Report for EP Patent Application No. 23802891.4, Issued on Oct. 2, 2024, 7 pages.
Office action received from Japanese patent application No. 2023-578888 mailed on Oct. 15, 2024, 8 pages (4 pages English Translation and 4 pages Original Copy).
Office action received from Japanese patent application No. 2023-578888 mailed on Apr. 1, 2025, 5 pages (2 pages English Translation and 3 pages Original Copy).
Office action received from Chinese patent application No. 202210507537.1 mailed on Jun. 20, 2025, 24 pages (13 pages English Translation and 11 pages Original Copy).
Office Action received for European Application No. 23802891.4, mailed on Dec. 5, 2025, 6 pages.

\* cited by examiner

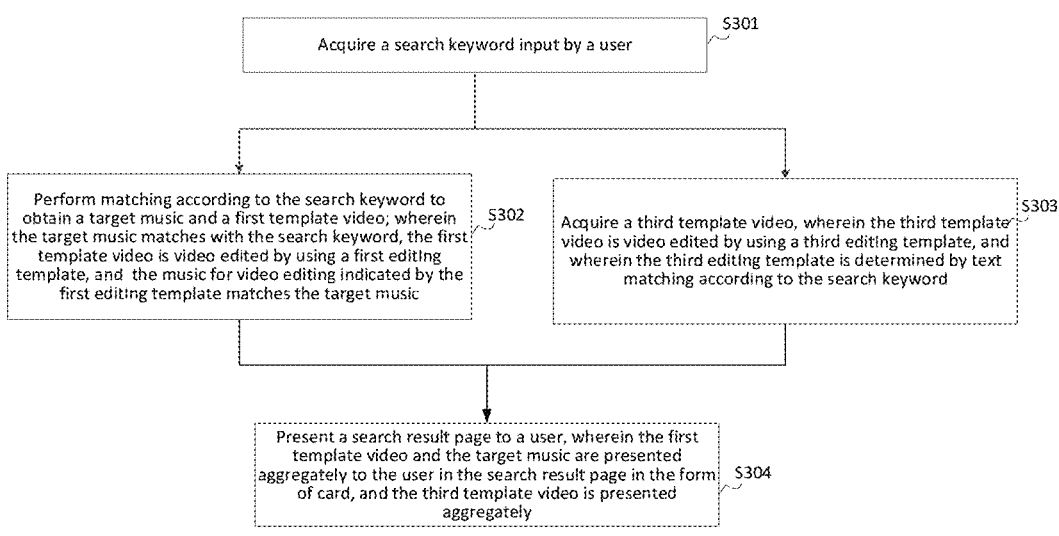
Fig. 3
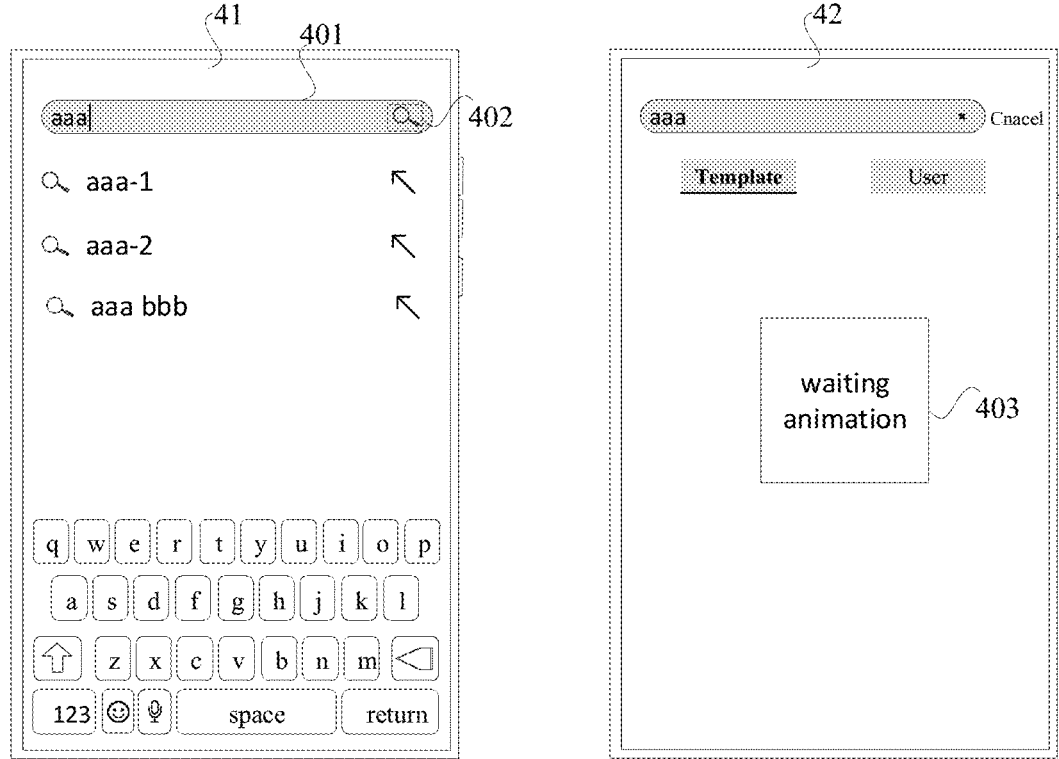
Fig. 4A                    Fig. 4B

45 aaa                                    ✕  Cancel

Template                  User 404          404b                                x1

404a          Cover        aaa            404d 404c                    hhh  99Template  5000W usages      404e Most likes Same          ▶  4 materials 800w usages        edit same 405a Default sort  ▼    type  ▼  segment  ▼  duration  ▼ x2 x3 xxTemplate        xxTemplate

VIDEO EDITING TEMPLATE SEARCH METHOD AND APPARATUS, ELECTRONIC DEVICE AND STORAGE MEDIUM

CROSS-REFERENCE OF RELATED APPLICATION

This application is a national stage of International Application No. PCT/CN2023/092955, filed on May 9, 2023, which claims the priority of a Chinese patent application No. 202210507537.1 filed in China Patent Office on May 10, 2022, both of the aforementioned applications are hereby incorporated by reference in their entireties.

FIELD OF THE INVENTION

The invention relates to the technical field of Internet, in particular to a video editing template search method, device, electronic device and storage medium.

BACKGROUND

With continuous development of Internet technology, users often choose an application (APP) to create videos. APP usually provides plentiful video editing templates and a variety of editing materials, and users can use the video editing templates and various editing materials provided by APP for video production.

DISCLOSURE OF THE INVENTION

The present disclosure provides a video editing template search method, apparatus, electronic device, and storage medium.

In a first aspect, an embodiment of the present disclosure provides a video editing template search method, including:

acquiring a search keyword input by a user;

performing matching according to the search keyword to obtain a target music and a first template video; wherein the target music matches with the search keyword, the first template video is video edited by using a first editing template, and wherein a music for video editing indicated by the first editing template matches the target music;

presenting a search result page to the user, wherein the first template video and the target music are presented aggregately to the user in the search result page in the form of card.

In a second aspect, an embodiment of the present disclosure provides a video editing template search apparatus, including:

an acquisition module configured to acquire a search keyword input by a user;

a processing module configured to perform matching according to the search keyword to obtain a target music and a first template video; wherein the target music matches with the search keyword, the first template video is video edited by using a first editing template, and wherein a music for video editing indicated by the first editing template matches the target music;

a display module configured to present a search result page to the user, wherein the first template video and the target music are presented aggregately to the user in the search result page in the form of card.

In a third aspect, an embodiment of the present disclosure also provides an electronic device, including a memory and a processor;

The memory is configured to store computer program instructions;

The processor is configured to execute the computer program instructions, so as to cause the electronic device to implement the video editing template search method according to the first aspect.

In a fourth aspect, an embodiment of the present disclosure also provides a computer-readable storage medium, including: computer program instructions; the electronic device executes the computer program instructions so as to cause the electronic device to implement the video editing template search method according to the first aspect.

In a fifth aspect, an embodiment of the present disclosure also provides a computer program product, which, when executed by an electronic device, causes the electronic device to implement the video editing template search method according to the first aspect.

DESCRIPTION OF THE DRAWINGS

The accompanying drawings, which are incorporated in and constitute a part of this specification, illustrate embodiments consistent with the disclosure and together with the description, serve to explain the principles of the disclosure.

In order to explain the technical scheme in the embodiment of the present disclosure or relevant technology more clearly, the drawings needed in the description of the embodiment or relevant technology will be briefly introduced below. Obviously, for ordinary people in the field, other drawings can be obtained according to these drawings without paying creative labor.

FIG. 3 is a flowchart of a video editing template search method provided by yet another embodiment of the present disclosure;

FIGS. 4A to 4E are schematic diagrams of human-machine interaction interfaces provided by the present disclosure;

DETAILED DESCRIPTION OF PREFERRED EMBODIMENTS

Figure 1:
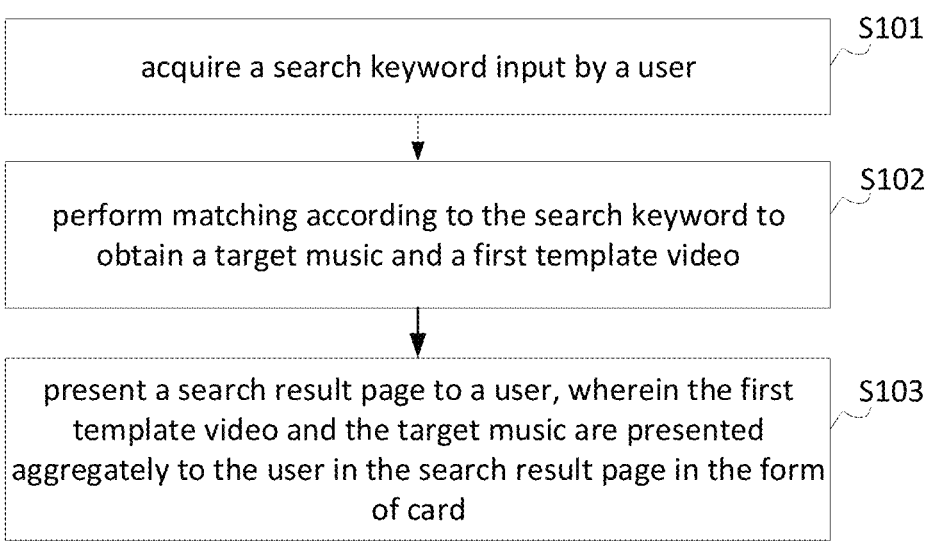
FIG. 1 is a flowchart of a video editing template search method provided by an embodiment of the present disclosure.

In order to understand the above objects, features and advantages of the present disclosure more clearly, the scheme of the present disclosure will be further described below. It should be noted that the embodiments of the present disclosure and the features in the embodiments can be combined with each other without conflict.

In the following description, many specific details are set forth in order to fully understand the present disclosure, but the present disclosure may be practiced in other ways than those described herein: Obviously, the embodiments in the specification are only part of the embodiments of the present disclosure, not all of them.

Music is a core element in video composition structure, when APP provides video editing templates, a user often initiates a search through a feature, i.e., music, and then select a video editing template the user wants according to the search results. At present, the APP will aggregately display the search results in the form of thumbnails, the users can click a thumbnail to jump to a playing page of a template video to check the editing effect of the template video and the music used in the template video. If it is not what users want, users need to quit the playing page and click the thumbnails of other template videos in the search results to check the editing effect of the template video and the music used in the template video, which greatly degrades the user's experience. In other words, users often can't find the desired video editing template quickly, which leads to poor user experience.

In order to solve the above problems, the present disclosure provides a method, apparatus, an electronic device, a storage medium and a program product for searching for a video editing template, wherein the method acquires a search keyword input by a user, performs matching according to the search keyword to obtain a target music and a first template video: wherein the target music matches with the search keyword, the first template video is video edited by using a first editing template, and then present the user the first template video and the target music aggregately in a search result page in the form of card. According to the present disclosure, more music relevant information adopted by the editing template aggregated in cards can be transmitted to the user in the search result page in the form of card, so that the user can quickly know the details of the first editing template adopted by the first template video, and the search efficiency of the video editing template is improved.

It should be noted that the editing templates mentioned in this disclosure are all video editing templates, and the editing templates are used to indicate one or more editing modes.

The video editing template search method provided by the present disclosure can be executed by a video editing template search apparatus, which can be implemented by any software and/or hardware. For example, the video editing template search apparatus can be an electronic device, and the electronic device may include, but not limited to, a mobile phone, a tablet computer, a wearable electronic device, a vehicle-mounted device, an augmented reality (AR)/virtual reality (VR) device, notebook computer, ultra-mobile personal computer (UMPC), netbook, personal digital assistant (PDA), smart TV, smart screen, high-definition TV, 4K TV, smart speaker, smart projector and other smart home devices, this disclosure does not impose any restrictions on the specific type of the electronic device. Among them, the disclosure does not limit the type of operating system of the electronic device, for example, Android system, Linux system, Windows system, iOS system, etc.

Next, the video editing template search method provided by this disclosure will be introduced in detail through several specific examples, combined with scenarios and drawings.

FIG. 1 is a flowchart of a video editing template search method provided by an embodiment of the present disclosure. In the following embodiments, an electronic device is taken as an example to illustrate the video editing template search method provided by the present disclosure. As shown in FIG. 1, the method of this embodiment includes:

S101: acquire a search keyword input by a user.

The electronic device can acquire the search keyword input by the user, and the search keyword can be used to match an editing template, wherein the editing template is used to indicate one or more editing modes, which can include, for example, the editing modes for one or more materials such as music, stickers, flower-shaped effects, special effects and filters.

The search keyword can be any text content, for example, the search keyword can include one or more of partial lyric content of the music that the user wants to find, the name of the music, the link of the music, etc. It shall be understood that the search keyword can also be other text content, for example, the name of the editing template that the user wants to find, the link of the editing template, etc.

In addition, the present disclosure does not limit how the electronic device acquires the search keyword input by the user, for example, the user can manually input, copy and paste, or input by voice.

S102, perform matching according to the search keyword to obtain a target music and a first template video.

Wherein the target music matches with the search keyword, the first template video is video edited by using a first editing template, and wherein a music for video editing indicated by the first editing template matches the target music, it also can be understood as the first template video is video edited by using the target music.

As a possible implementation, it is possible to first match a target music based on the search keyword, and then perform matching based on the target music, so as to obtain one or more first editing templates, then, for each first editing template, obtain a corresponding first template video (which can be one or more) from a set of template video obtained by video editing with the first editing template. The target music and the first template video can be understood as search results based on search keyword matching. Among them, the number of the first template videos may be one or more, and the present disclosure does not limit the number of the first template videos. The present disclosure does not limit the parameters of the first template video, such as duration, display clarity and so on.

Among them, the electronic device can perform matching among the downloaded local editing templates based on the target music matched with the search keyword to obtain one or more first editing templates, and then, for each first editing template, obtain a corresponding first template video (which can be one or more) from a set of template videos obtained by video editing with the first editing template: alternatively, the electronic device can interact with the server, send the search keyword to the server, and the server performs matching based on the search keyword to obtain one or more first editing templates matched with the target music, and then, for each first editing template, obtain a corresponding first template video (which can be one or more) from a set of template video obtained by video editing with the first editing template, and then distribute the matched one or more first template videos and the target music to the electronic device. Alternatively, the two manners can be used in combination.

S103: present a search result page to a user, wherein the first template video and the target music are presented aggregately to the user in the search result page in the form of card.

When the electronic device presents the search result page to the user, it presents the search result to the user in the form of card. Because the card has a stronger sense of hierarchy and a better visual effect, a better user experience can be achieved through the card. The card may include a first area for presenting the target music and a second area for presenting the first template video: the first area may include information about the target music, functional controls or portals relevant to the target music, etc. In the second area, the first template video can be playbacked for preview and the information relevant to the first template video can be presented, and functional controls or portals relevant to the first template video can be also included. A user can learn about the information relevant to the target music and preview the editing effect of the first template video by searching for cards in the results page.

The present disclosure does not limit the display parameters, such as the shape, size, color, etc., of the card used to present the search results in the search results page. For example, the card can be located near the top of the search results page and occupy most of the display screen of the electronic device, so as to present the search results to the user in a more prominent position. In some embodiments, considering music as an important element for video editing, in order to enable users to quickly understand the target music matched based on search keywords, a first area for displaying the target music can be disposed above a second area for displaying the first template video in the card.

Among them, the information relevant to the target music may include one or more of the cover information of the target music, the name of the target music, the artist information of the target music, the number of the target editing templates aggregated according to the target music, and the total usage amount of all the target editing templates aggregated according to the target music, etc.

Controls or portals relevant to the target music can include: play controls, portals to aggregation pages corresponding to the target music, and so on.

Among them, the information relevant to the first template video may include one or more of the number of multimedia materials used by the first template video, the duration of the first template video, the usage amount of the target editing template used in the first template video, the nickname of the publisher of the first template video, the head portrait of the publisher, and so on.

The controls or portals relevant to the target music may include: play control buttons, usage portals for the first editing template adopted by the first template video, portals to aggregation pages corresponding to the target music, and so on.

According to the method provided by this embodiment, more music relevant information adopted by the editing template aggregated in the card is transmitted to the user in the search result page in the form of card, so that the user can quickly know the details of the first editing template adopted by the first template video, and the search efficiency of the video editing template is improved.

Figure 2:
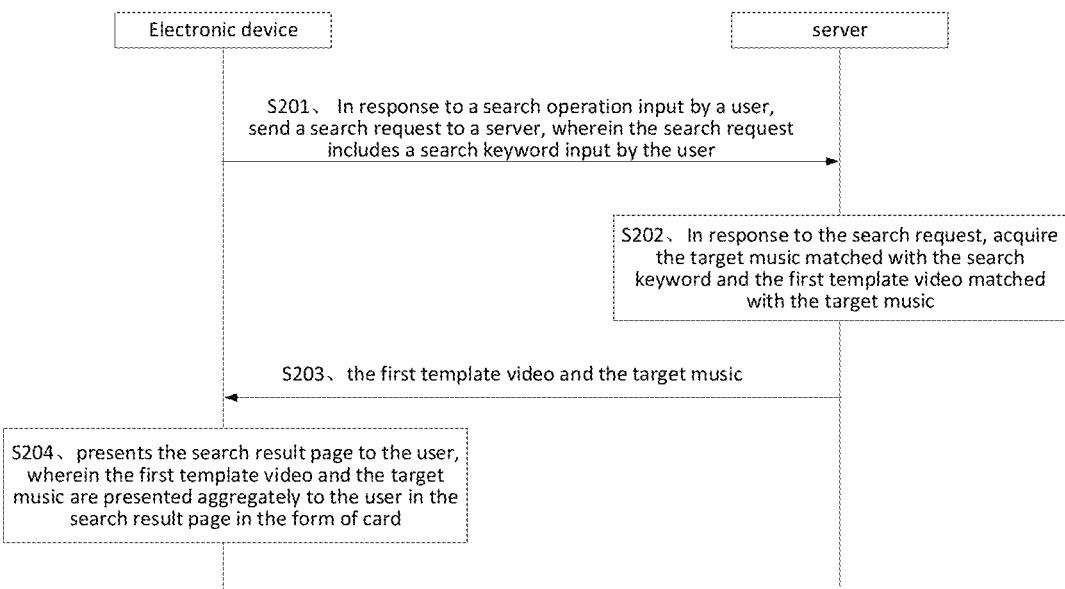
FIG. 2 is a flowchart of a video editing template search method provided by another embodiment of the present disclosure.

On the basis of the embodiment as shown in FIG. 1, as a possible implementation, the electronic device can interact with the server to perform the video editing template search. The embodiment shown in FIG. 2 will be taken as an example for illustration. As shown in FIG. 2, the method of this embodiment includes:

S201. In response to a search operation input by a user, an electronic device sends a search request to a server, wherein the search request includes a search keyword input by the user.

As a possible implementation, the electronic device can acquire the search keyword input by the user, generate the search request by operating an button presented by the electronic device to trigger the search, and send the search request to the server, so that the server can determine the target music and the first template video matching with the target music by performing matching according to the search keyword included in the search request.

S202: In response to the search request, the server acquires the target music matched with the search keyword and the first template video matched with the target music.

As a possible implementation, the server can match the target music in a music library according to the search keyword, and aggregate the editing templates matched with the target music from a video editing template library according to the identification (such as ID) of the target music, if a plurality of editing templates matched with the target music are aggregated, a part of the plurality of editing templates can be screened out as the editing templates to be presented in the electronic device through card aggregation.

In some embodiments, the server can determine whether to return the information relevant to the target music to the electronic device based on intention analysis result output by a pre-trained music intention analysis model and in combination with the number of the target editing templates aggregated according to the target music, that is, whether the electronic device needs to display the information relevant to the target music through a first card. Among them, the music intention analysis model can be any type of machine learning model, such as deep neural network, random forest model, etc., and the music intention analysis model can analyze the search keyword included in the search request and output the intention analysis result, which can be a numerical result.

For example, the intention analysis result output by the music intention analysis model is a numerical value, and if the numerical value is lower than a preset threshold, it is determined that the electronic device does not need to display the information relevant to the target music through the first card: if the numerical value is greater than or equal to the preset threshold, and the number of target editing templates aggregated based on the target music is greater than a preset number, it is determined that the electronic device needs to display the information relevant to the target music through the first card.

Among them, the values of the preset threshold and the preset numerical value are not limited in this disclosure, and can be set according to actual needs: for example, if the value range of the analysis result output by the music intention analysis model is 0 to 1, for example, the preset threshold value is 0.8, the present numerical value is 50.

In some embodiments, a set of search keywords can be set in advance, and when search results are returned for the search keywords in the set, the server can determine that the electronic device does not need to present the search results through cards, and the server may also not send the target music to the electronic device.

S203: The server sends the first template video and the target music to the electronic device. Accordingly, the electronic device receives the first template video and the target music sent by the server.

In some embodiments, the electronic device and the server can agree on the display parameters of the card in advance, when the electronic device determines that the search result returned by the server contains the target music, the electronic device determines that it needs to present the search result in the form of card and displays it according to the display parameters agreed in advance. By adopting this method, the amount of interactive data between the electronic device and the server can be reduced, and the network overhead can be reduced.

In other embodiments, the server can determine the display parameters of the card according to the target music, and send the display parameters of the card to the electronic device, so that the electronic device can configure the card according to the received display parameters to present the search results sent by the display server aggregately.

In some embodiments, the server may also send a display style for presenting the first template video to the electronic device. Among them, the display parameters of the first template video may include: size and position of a respective display area, the display style of operation control or portal relevant to the first template video, and so on.

S204. The electronic device presents the search result page to the user, wherein the first template video and the target music are presented aggregately to the user in the search result page in the form of card.

The electronic device can determine the display style of a card in the manner described in step S203, and present the search result sent by the server in the card according to the determined display style.

The implementation of this step is similar to step S103 in the embodiment shown in FIG. 1, and can refer to the detailed description of the embodiment shown in FIG. 1, and for the sake of brevity, it will not be repeated here.

According to the method provided by this embodiment, when the electronic device presents the search results, the target music and the template videos aggregated based on the target music are presented aggregated through a specific card, so that the search result page can more intuitively transmit the music relevant information of the first editing templates adopted by these first template videos to the user, which is beneficial for the user to quickly determine whether the search result returned by the server contains an editing template that meets expectations, and can effectively improve the search efficiency for video editing templates.

FIG. 3 is a flowchart of a video editing template search method provided by another embodiment of the present disclosure. As shown in FIG. 3, the method of this embodiment can include:

S301, Acquire a search keyword input by a user.

S302, Perform matching according to the search keyword to obtain a target music and a first template video: wherein the target music matches with the search keyword, the first template video is video edited by using a first editing template, and wherein a music for video editing indicated by the first editing template matches the target music.

Steps S301 and S302 in this embodiment are similar to steps S101 and S102 in the embodiment shown in FIG. 1, respectively, and can refer to the detailed description of the embodiment shown in FIG. 1.

S303: Acquire a third template video, wherein the third template video is video edited by using a third editing template, and wherein the third editing template is determined by text matching according to the search keyword.

Among them, text matching can be carried out according to the search keyword and any relevant information of the editing template, so as to determine the third editing template matching with the search keyword, wherein any relevant information of the editing template can include, for example, but not limited to: the name of the editing template, the type information of the editing template, the topic of the template video obtained by video editing using the editing template, the name of the material indicated by the editing template, the content of the material (such as the content of the sticker, the content of the text), and so on.

As a possible implementation, the server can perform matching based on the search keyword and the relevant information of each editing template in the video editing template library based on, so as to determine the third editing template, and then determine the third template video from the set of template videos obtained by video editing using the third editing template, and send the third template video to the electronic device.

It should be noted that the number of the third editing template is not limited in this disclosure, and it can be one or more, which can be set according to the actual situation.

S304: Present a search result page to a user, wherein the first template video and the target music are presented aggregately to the user in the search result page in the form of card, and the third template video is presented aggregately.

Among them, the implementation of presenting the target music and the first template video through the card can refer to the description of the embodiment as shown in FIG. 1.

The electronic device can present a thumbnail corresponding to the third template video on the search result page, and the user can jump from the search result page to the video playing page to watch the content of the third template video by clicking the thumbnail of the third template video.

In addition, the area for aggregately presenting the third template video can be located below the card for aggregately presenting the first template video and the target music, and the user can view more third template videos by sliding up and down.

The method of this embodiment can present two types of search results in the search results page to the user, one of which is the first editing template aggregated based on the target music, and the other is the third editing template aggregated by text matching based on the search keyword, by presenting the user the editing templates matched in different ways, users can choose the editing template that meet expectations to use, which is beneficial to improve the search efficiency of video editing templates.

On the basis of the embodiments shown in FIGS. 1 to 3, combined with the foregoing, the first area in the card used for presenting the target music can also provide a portal to an aggregation page corresponding to the target music, and the protal can be configured in any way, for example, the user's triggering operation on some specific positions in the area used for presenting the target music in the card can be regarded as the triggering operation on the portal, and then the aggregation page corresponding to the target music can be entered, therefore, the electronic device can, in response to the user's triggering operation (such as clicking operation) on the area in the card for presenting the target music, jump from the search page to the aggregation page corresponding to the target music, and the aggregation page is used for presenting a plurality of second template videos aggregately.

On the basis of the embodiments shown in FIGS. 1 to 3, when the first template video is displayed in the search result page through a card, the electronic device can switch the first template video being played in the search page in response to the user's switching operation (for example, sliding operation for the area in the card for presenting the first template video). When the last first template video is presented in the card, the electronic device will jump from the search result page the aggregation page corresponding to the target music in response to the user's switching operation (such as sliding operation) on the last first template video. When the user switches to the last template video, he continues to input the switching operation, which means that the user wants to browse the editing effects of more editing templates, therefore, by jumping to the aggregation page, more second template videos obtained by using the second editing template matched with the target music can be presented to the user for the user to preview and choose, so as to meet the user's needs.

It should be noted that the second template video in the aggregate page corresponding to the target music illustrated here adopts the second editing template for video editing, and a music used for video editing indicated by the second editing template matches the target music. The second template video may or may not include the first template video shown in the card, or it may be understood that the second editing template may or may not include the first editing template, and may be set as required.

The acquisition method of the second template video may be similar to that of the first template video, which can refer to the foregoing.

On the basis of the embodiment shown in FIG. 1 to FIG. 3, a card in the search result page can further include: a play control button corresponding to the first template video, displaying the first template video can be suspended or resumed in response to the user's triggering operation on a play control button corresponding to the first template video. By displaying the play control button, the user's demand for previewing the template video can be met. The present disclosure does not limit the display parameters corresponding to the play back control button.

On the basis of the embodiment shown in FIG. 1 to FIG. 3, the card in the search result page can also display a recommendation reason corresponding to the first template video. By presenting the recommendation reason to the user, more information of the first editing template corresponding to the first template video that being currently played can be transmitted to the user. The present disclosure does not limit the display parameters corresponding to the recommendation reason.

On the basis of the embodiment shown in FIG. 1 to FIG. 3, the card in the search result page can also includes a usage portal corresponding to the first editing template adopted by the first template video, in response to the user's triggering operation on the usage portal, the electronic device can jump from the search result page to the video editing page, where the user can import materials to be edited (such as videos, photos, images, live images, etc.) and can edit the imported materials to be edited into videos by the editing manner indicated by the corresponding first editing template. By presenting the usage portal to the user, it is convenient for the user to use the first editing template corresponding to the first template video, which is beneficial to improve the user's experience.

It should be noted that in the video editing page, the imported material can be aggregately presented to users, and the information, such as the number of materials corresponding to the first editing template and the display duration of each piece of material in the edited video, etc., can be presented to the user, after the user selects the materials to be edited, the user can trigger the synthesis by triggering the edit button in the video editing page.

In order to introduce the method of the present disclosure more clearly, taking the electronic device being a mobile phone and an APP (hereinafter referred to as Application 1) installed in the mobile phone as an example, the video editing template search method provided by the present disclosure and the interaction between the user and the electronic device are exemplarily explained through the human-machine interaction interfaces shown in FIGS. 4A to 4E.

As shown in FIG. 4A, the user interface 41 includes an area 401 and a control 402.

Among them, the area 401 can be used to display a text box, which can display search keywords input by users. The control 402 is used to trigger Application 1 to generate a search request and send the search request to the server.

The present disclosure does not limit the display positions of the area 401 and the control 402. For example, the area 401 and the control 402 can be displayed in the homepage of Application 1, or the area 401 and the control 402 can also be displayed in the template aggregation page, and of course, they can also be displayed in other pages, which are not exemplified here.

The user can click on the area 401 and input a search keyword in the area 401. Assuming that the search keyword currently input by the user is "aaa", during the input process, Application 1 can display a plurality of candidate keywords below the area 401, and if the candidate keywords contain the content required by the user, it is convenient for the user to select therefrom.

Referring to FIG. 4A by way of example, a plurality of rows are displayed below the area 401 in the top-down order, wherein each row displays a candidate keyword, for example, "aaa-1", "aaa-2", "aaa bbb" and so on.

Of course, the user can also input the search keyword by copying and pasting, for example, by locating in the area 401 and long pressing, so that Application 1 displays a paste control, and the user can click the paste control to paste the contents in the clipboard into the area 401.

After the user finishes inputting the search keyword, the user can operate the control 402 (for example, click the control 402), and Application 1 generates a search request in response to the user's triggering operation on the control 402, and sends the search request to the server.

Before the server returns the search result, Application 1 can display an interface waiting for the search result. Illustratively, Application 1 can jump to a user interface 42 shown in FIG. 4B. The user interface 42 includes an area 403 for displaying a waiting animation. The present disclosure does not limit the waiting animation.

Figures 4C, 4D:
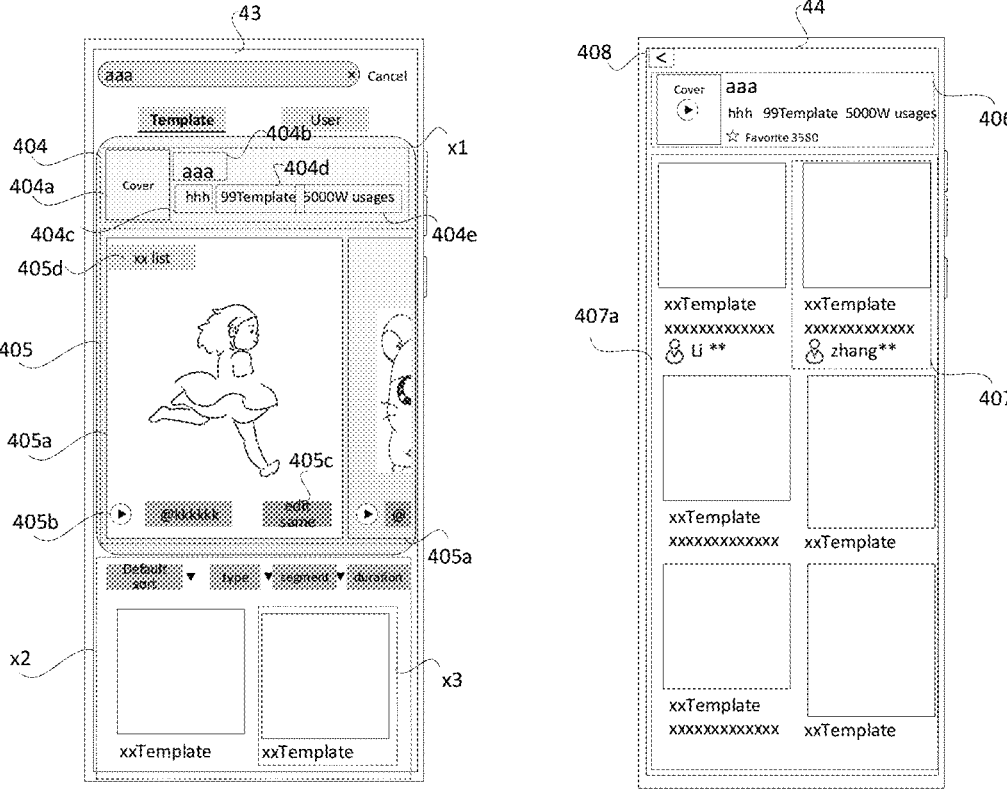

When Application 1 receives the search result sent by the server, Application 1 can jump from the user interface 42 shown in FIG. 4B to the user interface 43 shown in FIG. 4C.

The user interface 43 is used to present the search result page, wherein the user interface 43 includes an area x1 corresponding to the card, and the target music and the first template video (five template videos are taken as examples in this embodiment) are presented aggregately in the area x1. The present disclosure does not limit the display parameters, such as the size, position, etc., of the area x1. For example, the area x1 can be located in a prominent position in the user interface 43, for example, near the top of the mobile phone.

The area x1 may further include an area 404 for presenting the target music and an area 405 for presenting the first template video.

For example, referring to FIG. 4C, the area 404 includes an area 404a, an area 404b, an area 404c, an area 404d and an area 404e. Among them, a cover image of the target music is displayed in the area 404a: the area 404b is used to display the name of the target music, for example, the name of the target music shown in FIG. 4C is "AAA"; the area 404C is used to display the singer name corresponding to the target music, and "hhh" as shown in FIG. 4C represents the singer name: the area 404d is used to display the number of editing templates aggregated according to the target music, for example, in FIG. 4C, 99 editing templates are aggregated according to the music "aaa": the area 404e is used to display the total usage amount of all editing templates aggregated according to the target music, for example, in FIG. 4C, 99 editing templates are aggregated according to the target music "aaa", and the total usage amount of 99 editing templates is "5000w".

In addition, other portals or controls may be included in the area 404, for example, portals for viewing the list to which the target music belongs, portals for viewing similar music, and so on (not shown in FIG. 4C). Among them, similar music can be determined by the server according to the characteristics of music in different dimensions, such as music style characteristics, music mood characteristics, music scenario characteristics and so on.

In addition, by clicking on a specific position of the area 404 (for example, a free area on the right of the singer's name in the embodiment shown in FIG. 4C), it can jump from the user interface 43 shown in FIG. 4C to the user interface 44 shown in FIG. 4D, and the user interface 44 is used to present the aggregated page corresponding to the target music, in which one or more second template videos aggregated according to the target music can be presented in a thumbnail manner. Hereinafter, the implementation of the aggregated page will be exemplarily shown.

Continue to refer to FIG. 4C, the area 405 is used to present the first template videos included in the search result, in which each first template video corresponds to a display area 405a in which the first template video can be played, information relevant to the first template video can be displyaed, and control buttons, portals and the like relevant to the first template video can be displayed. The present disclosure does not limit the display parameters, such as the size, position, etc., of the area 405. For example, the area 405 may be located below the area 404, and the size of the area 405 is large to ensure the playing effect of the first template video.

From the foregoing, the server can send a plurality of first template videos to Application 1, and each first template video can correspond to a display area 405a, upon receipt of a user's triggering operation in the area 405 (such as a sliding to the left operation or a sliding to the right operation), Application 1 can control the display area 405a to move from left to right or from right to left, thereby switching the display areas 405a corresponding to different first template videos displayed in the area 405.

Among them, in the area 405a, the first template video can be automatically played (for example, when the user slides to the exhibition area corresponding to the first template video and stays for a preset duration), or the first template video cannot be played automatically by default, but can be triggered to play based on the user clicking the play control button.

In some embodiments, the size of the display area 405a can be smaller than that of the area 405, so that more than one display area 405a can be presented in the area 405, as shown in FIG. 4C, a complete presentation area 405a (assuming that it corresponds to the template video 1) and a partial presentation area 405a (assuming that it corresponds to the template video 2) are presented in the area 405, which can remind users to view more first template videos. When Application 1 receives the sliding to the left operation input by the user, Application 1 can control the display areas 405a corresponding to a plurality of first template videos to move to the left in sequence according to the sliding operation speed and sliding distance input by the user, and the moving speed of the display areas 405a is relevant to the user operation.

Figure 4E:
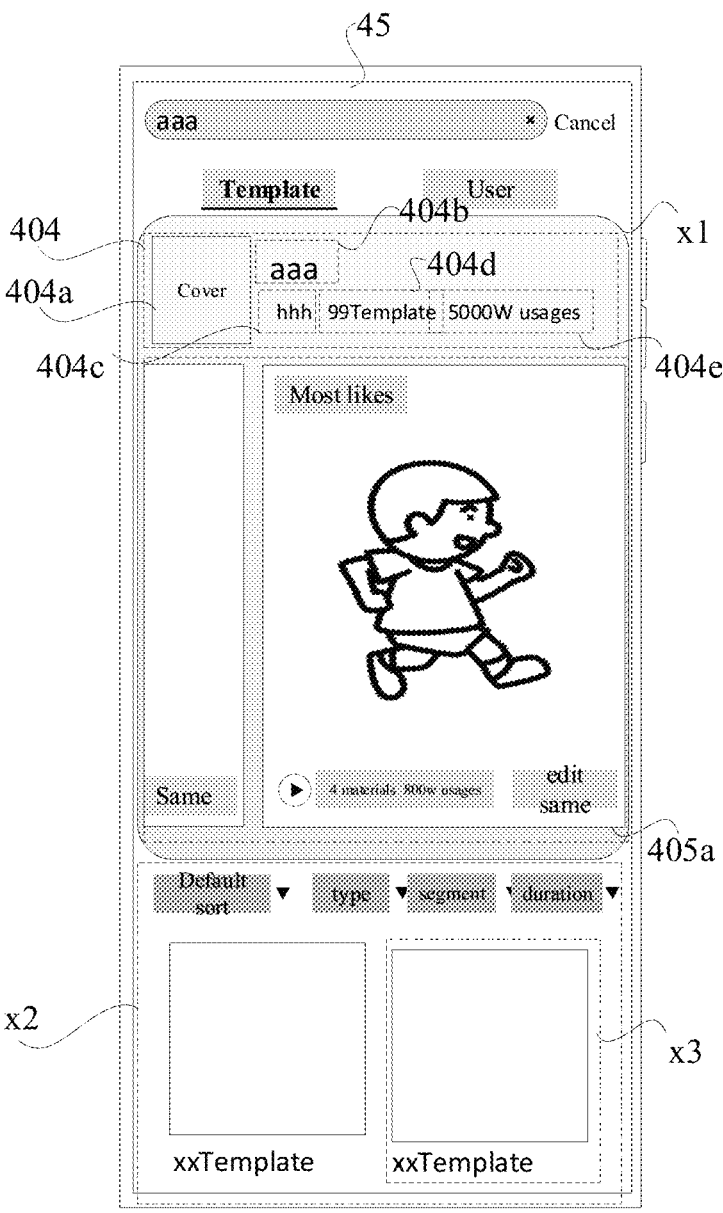

For example, on the basis of FIG. 4C, Application 1 receives the sliding to the left operation input by the user, and the speed of the user's sliding to the left operation is fast, so Application 1 can jump to the user interface 45 shown in FIG. 4E, and a display area 405a corresponding to the last first template video sent by the server is mainly displayed in the area 405 of the user interface 45, since the area of the display area 405a corresponding to the last first template video is smaller than the area 405, on the left of the display area 405a corresponding to the last first template video, there exists a part of the display area 405a corresponding to the last but one first template video sent from the server.

On the basis of the embodiment shown in FIG. 4E, the user can further input a sliding to the right operation, so as to view top-ranked multiple first template videos. Its implementation is similar to that the user input the sliding to the left operation, so for the sake of brevity, it will not be repeated here.

It should be noted that if the user updates the software version of Application 1 and uses the video editing template search function for the first time, Application 1 can also display a prompt operation to the user, so as to prompt the user to view a plurality of first template videos and preview the corresponding editing effect by sliding left and right.

In combination with the foregoing, the information relevant to the first template video displayed in the display area 405a may include one or more of the number of multimedia materials used in the first template video, the duration of the first template video, the usage amount of the target editing template used in the first template video, the nickname of the publisher of the first template video, the head portrait of the publisher, and the like.

It should be noted that the relevant information of different first template videos in the presentation area 405a may not be exactly the same. For example, in the embodiment shown in FIG. 4C, the nickname "kkkk" of the publisher of the first first template video is displayed in the display area 405a in the current area 405.

In this disclosure, Application 1 supports the user to switch the presentation area 405a displayed in the area 405 through touch operation (such as sliding left and right). As shown in FIG. 4E, when the user controls the area 405 by sliding to display the presentation area 405a corresponding to the last first template video, then in the display area 405a corresponding to the last first template video, the number of multimedia materials used by the last first template video and the usage amount "four materials for 800w people" of editing templates corresponding to the last first template video can be displayed.

On the basis of the embodiment shown in FIG. 4E, Application 1 can respond to the sliding operation input by the user, and Application 1 can jump to the aggregation page corresponding to the target music shown in FIG. 4D, so that the user can view more editing effects of the editing template based on the target music aggregation.

In addition, in combination with the foregoing, the presentation area 405a can also a display control button relevant to the first template video, for example, as shown in FIG. 4C, and the presentation area 405a includes a play control button 405b. The user can control to pause playing the first template video by operating the play control button 405b (for example, clicking the play control button 405b), and control to continue playing the first template video when the user operates the play control button 405b again. The user can repeatedly operate the play control button 405b many times, and then the corresponding playing state of the first template video can be switched between playing and pausing.

In addition, in combination with the foregoing, the exhibition area 405a can also display a portal relevant to the first template video. For example, as shown in FIG. 4C, the presentation area 405a may include a portal 405c, which is the usage portal of the first editing template corresponding to the first template video. In response to the user's trigger operation on the portal 405c, Application 1 can jump to the video editing page, through which the imported material can be video-edited by using the first editing template.

Specifically, in response to the user's triggering operation on the portal 405c, Application 1 can jump to a video editing page, which may include a material presentation area for aggregately presenting multimedia materials stored locally in electronic device, such as taken photos, videos, videos obtained by screen recording, images downloaded from the network, images saved by screen capture, etc., the user can select multimedia materials to be imported through the material presentation area, and after the selection, the user can operate the control provided in the video editing page, to trigger Application 1 to synthesize the imported materials by using the edit manner indicated by the first editing template. In some embodiments, the video editing page can also display the number of materials needed for video editing and the display duration of each material in the edited video, which is convenient for users to import appropriate materials for video editing.

In addition, in combination with the foregoing, the presentation area 405a may further include an area 405d for presenting a recommendation reason corresponding to the first template video, wherein the number of the recommendation reasons may be one or more, and is not limited in this disclosure, and the recommendation reasons may be relevant to the likes amount, usage among, views amount of the target editing template corresponding to the first template video, the editing template entering a specific list, and the like. For example, the usage amount of the target editing template corresponding to the first template video is the highest among a plurality of target editing templates aggregated based on the current target music, then the recommendation reason "most used" can be displayed in the area 405d corresponding to the first template video: for another example, the likes amount of the target editing template corresponding to the first template video is the highest among a plurality of target editing templates aggregated based on the current target music, then the recommendation reason "most likes" can be displayed in the area 405d corresponding to the first template video: for another example, when the target editing template corresponding to the first template video enters some specific lists, the recommendation reason "xx list" can be displayed in the area 405d corresponding to the first template video, and "xx list" indicates the list name.

In some embodiments, the priority order of the recommendation reasons can be set, for example, the priority of the three recommendation reasons, namely, entering a specific list, most used and most likes, is from high to low. Of course, the priority order can also be set in other ways, and this is just an example. When the target editing template corresponding to the first template video has multiple recommendation reasons, the recommendation reason with the highest priority can be displayed, or all the recommendation reasons can be displayed, or one of the recommendation reasons can be randomly selected for display.

For example, in the area 405d corresponding to the first first template video shown in FIG. 4C, the recommendation reason is "xx list", and in the area 405d corresponding to the last first template video shown in FIG. 4E, the recommendation reason is "Most likes". It should be noted that if some template videos have no corresponding recommendation reason, the corresponding area 405d may not be displayed.

FIG. 4D exemplarily shows a schematic diagram of an aggregation page corresponding to the target music. The user interface 44 shown in FIG. 4D includes an area 406 and an area 407.

The area 406 is used to present the relevant information of the target music. In some embodiments, the first card can be presented in the area 406, which is similar to the implementation of the embodiment shown in FIG. 4B. In the area 406, a music playing control button can also be included, and the user can click the music playing control button for playing the target music. And the area 406 can also include a favorite button, and the user can click the favorite button for adding the target music to the music favorite list.

The area 407 is used to present a second template video in thumbnail, and each second template video corresponds to a target editing template. As shown in FIG. 4D, the area 407 includes a plurality of areas 407a, which are arranged from left to right and from top to bottom. Each area 407a is used to present a cover corresponding to a second template video, and the cover can be dynamic or static, the user can click on the area 407a to cause to jump from the user interface 44 shown in FIG. 4D to the video playing page, so as to play the corresponding second template video in the video playing page, the user can trigger a return control in the video playing page for returning to the aggregation page shown in FIG. 4D by, and re-select a second template video to play.

In some embodiments, the user interface 44 may further include a return control 408 for returning to the search result page as shown in FIG. 4B. It can be understood that the user interface 44 can also include other controls or portals, for example, a control for collecting the target music, a portal for viewing a song list corresponding to a singer corresponding to the target music, and so on.

According to the embodiment shown in FIG. 3, a third template video for a third editing template determined by text matching based on a search keyword can also be displayed in the search results page. For example, on the basis of the embodiment shown in FIG. 4C and FIG. 4E, a third template video may be presented aggregately below the area x1.

For example, as shown in FIG. 4C, the user interface 43 can further include an area x2 to aggregately present one or more third template videos. In the area x2, the third template video corresponds to a display area x3, in which the cover of the third template video, the publisher of the third template video, the usage amount of the third editing template adopted by the third template video and so on can be presented. The present disclosure does not limit the information presented in the presentation area x3.

The user can make the card x1 move upward gradually and then slide out of the display screen of the mobile phone (that is, it is no longer displayed in the display screen of the mobile phone) in a sliding upward manner, at the same time, the upper edge of the area x2 moves upward gradually until it reaches the set upper boundary position, as the user slides upward, the user can view more third template videos in the area x2. On this basis, the user can also cause card x1 to re-present at the top of the search results page in a sliding downward manner.

In addition, the area x2 may include a button for sorting the third template videos and a button for screening out. For example, the four buttons are shown at the top of the area x2, and when clicked, can trigger the display of corresponding pop-up windows, and the user can set the sorting mode of the third template videos or screen out the third template video by operating the options in the pop-up window, which are not exemplified here.

The way in which the third template video is presented in FIG. 4E may be similar to that in FIG. 4C, so for the sake of brevity, it will not be repeated here.

In practical application, the layout and display style of the user interface can be set flexibly, and not limited to the above-mentioned implementation shown in FIGS. 4A to 4E.

Illustratively, the present disclosure also provides a video editing template search apparatus.

Figure 5:
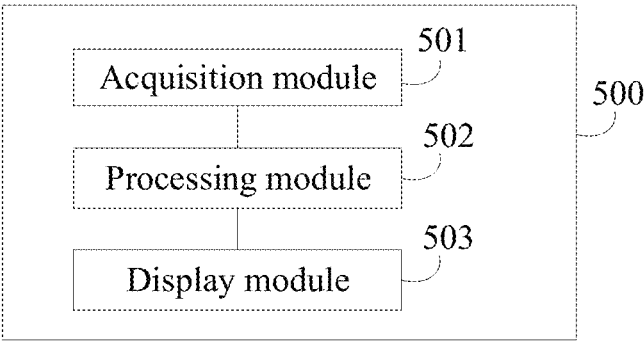
FIG. 5 is a structural diagram of a video editing template search apparatus provided by an embodiment of the present disclosure.

FIG. 5 is a schematic structural diagram of a video editing template search apparatus provided by an embodiment of the present disclosure. With reference to FIG. 5, the video editing template search apparatus 500 provided by this embodiment may include:

an acquisition module 501 configured to acquire a search keyword input by a user;

a processing module 502 configured to perform matching according to the search keyword to obtain a target music and a first template video: wherein the target music matches with the search keyword, the first template video is video edited by using a first editing template, and wherein a music for video editing indicated by the first editing template matches the target music;

a display module 503 configured to present a search result page to a user, wherein the first template video and the target music are presented aggregately to the user in the search result page in the form of card.

In some embodiments, the processing module 502 is further configured to acquire a plurality of second template videos in response to the user's triggering operation on a display area in the card corresponding to the target music: wherein the second template video is video edited by using a second editing template, and wherein a music for video editing indicated by the second editing template matches the target music.

The display module 503 is further configured to jump from the search result page to the aggregation page corresponding to the target music, wherein the plurality of second template videos are presented in the aggregation page aggregately.

In some embodiments, the processing module 502 is further configured to, when the last first template video is displayed in the card, acquire a plurality of second template videos matched with the search keyword in response to the user's switching operation on the last first template video: wherein the second template video is video edited by using a second editing template, and wherein a music for video editing indicated by the second editing template matches the target music.

The display module 503 is further configured to jump from the search result page to the aggregation page corresponding to the target music, wherein the plurality of second template videos are presented in the aggregation page aggregately.

In some embodiments, the display module 503 is further configured to automatically play the first template video in the card.

In some embodiments, the processing module 502 is further configured to, when the first template video is displayed in the card, control to suspend or resume displaying the first template video in response to the user's triggering operation for a play control button corresponding to the first template video.

In some embodiments, the display module 503 is further configured to display a recommendation reason corresponding to the first template video in the card.

In some embodiments, the display module 503 is specifically used to display information relevant to the target music in the card, wherein the information relevant to the target music comprises one or more of cover of the target music, name of the target music, singer information corresponding to the target music, the number of video editing templates aggregated according to the target music, and total usage amount of the video editing templates aggregated according to the target music.

In some embodiments, the display module 503 is further configured to display a usage control corresponding to the first editing template used by the first template video; and the display module 503 is further configured to jump to a video editing page in response to the user's triggering operation on the usage portal, so as to edit the imported material in the video editing page by using the first editing template.

In some embodiments, the processing module 502 is further configured to acquiring a third template video, wherein the third template video is video edited by using a third editing template, and wherein the third editing template is determined by text matching according to the search keyword.

The display module 503 is further configured to present the third template video in the search result page aggregately.

In the foregoing embodiment, the processing module 502 can interact with the server through the communication component in the video editing template search apparatus, send the search keyword input by the user to the server, and acquire one or more of the target music, the first template video, the second template video and the third template video from the server.

The apparatus provided by this embodiment can be used to execute the video editing template search method in any of the aforementioned embodiments, and its implementation principle and technical effect are similar, and can refer to the detailed description of the aforementioned method embodiment, and for the sake of brevity, it will not be repeated here.

Figure 6:
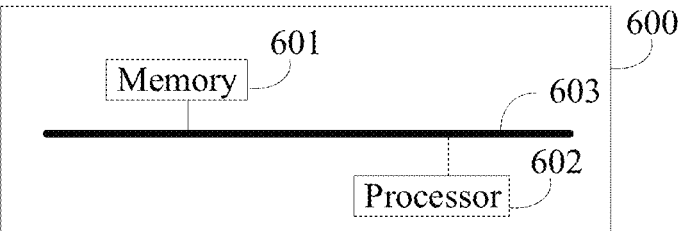
FIG. 6 is a schematic structural diagram of an electronic device provided by an embodiment of the present disclosure.

FIG. 6 is a structural schematic diagram of an electronic device provided by another embodiment of the present disclosure. As shown in FIG. 6, an electronic device 600 provided by this embodiment includes a memory 601 and a processor 602.

The memory 601 can be a separate physical unit and can be connected with the processor 602 through a bus 603. The memory 601 and the processor 602 can also be integrated and realized by hardware.

The memory 601 is used for storing program instructions, and the processor 602 calls the program instructions to execute the video editing template search method provided by any of the above method embodiments.

Alternatively, when part or all of the methods in the above embodiments are implemented by software, the above electronic device 600 may only include the processor 602. The memory 601 for storing programs can be located outside the electronic device 600, and the processor 602 can be connected with the memory through circuits/wires for reading and executing the programs stored in the memory.

The processor 602 may be a central processing unit (CPU), a network processor (NP), or a combination of CPU and NP.

The processor 602 may further include a hardware chip. The hardware chip can be an application-specific integrated circuit (ASIC), a programmable logic device (PLD) or a combination thereof. The PLD may be a complex programmable logic device (CPLD), a field-programmable gate array (FPGA), a generic array logic (GAL) or any combination thereof.

The memory 601 may include a volatile memory, such as a random-access memory (RAM): The memory can also include a non-volatile memory, such as flash memory, hard disk drive (HDD) or solid-state drive (SSD): the memory may also include a combination of the above kinds of memories.

The present disclosure also provides a readable storage medium, including computer program instructions, which, when executed by at least one processor of an electronic device, cause the electronic device to implement the video editing template search method provided in any method embodiment.

The present disclosure also provides a computer program product, which, when run on a computer, causes the computer to implement the video editing template search method as provided in any method embodiment.

It should be noted that in this paper, relational terms such as "first" and "second" are only used to distinguish one entity or operation from another entity or operation, and do not necessarily require or imply that there is any such actual relationship or order between these entities or operations. Moreover, the terms "include", "comprise" or any other variation thereof are intended to cover non-exclusive inclusion, so that a process, method, article or equipment including a series of elements includes not only those elements, but also other elements not explicitly listed, or elements inherent to such process, method, article or equipment. Without further restrictions, an element defined by the phrase "including one" does not exclude the existence of other identical elements in the process, method, article or equipment including the element.

What has been described above is only the specific embodiment of the present disclosure, so that those skilled in the art can understand or realize the present disclosure. Many modifications to these embodiments will be obvious to those skilled in the art, and the general principles defined herein can be implemented in other embodiments without departing from the spirit or scope of this disclosure. Therefore, this disclosure will not be limited to the embodiments described herein, but is to be accorded the widest scope consistent with the principles and novel features disclosed herein.

What is claimed is:

1. A video editing template search method, comprising:
acquiring a search keyword input by a user;
performing matching according to the search keyword to obtain a target music and a first template video that is video edited by using the target music;
wherein the performing matching according to the search keyword to obtain a target music and a first template video that is video edited by using the target music, comprises:
acquiring the target music that matches with the search keyword, acquiring one or more first editing template by perform matching according to the target music, wherein a music for video editing indicated by the first editing template matches the target music;
for each first editing template, acquiring one or more corresponding first template video from a set of template video obtained by video editing with the first editing template;
presenting a search result page to the user, wherein the one or more first template video and the target music are presented aggregately to the user in the search result page in the form of card, wherein the card comprises an area for presenting the target music and an area for presenting the one or more first template video;
wherein the method further comprises:
determining one or more third editing template matching with the search keyword by text matching according to the search keyword;
for each third editing template, acquiring one or more corresponding third template video from a set of template video obtained by video editing with the third editing template; and
presenting the one or more third template video in the search result page outside the card.

2. The method of claim 1, further comprising:
when the last first template video is displayed in the card, acquiring a plurality of second template videos matched with the search keyword in response to the user's switching operation on the last first template video; wherein the second template video is video edited by using a second editing template, and wherein a music for video editing indicated by the second editing template matches the target music;
jumping from the search result page to an aggregation page corresponding to the target music, wherein the plurality of second template videos are presented in the aggregation page aggregately.

3. The method of claim 1, wherein the presenting the user the first template video and the target music aggregately in the search result page in the form of card, comprises:
automatically playing the first template video in the card.

4. The method of claim 1, further comprising:
when the first template video is displayed in the card, controlling to suspend or resume displaying the first template video in response to the user's triggering operation for a play control button corresponding to the first template video.

5. The method of claim 1, further comprising:
displaying a recommendation reason in the card corresponding to the first template video.

6. The method of claim 1, wherein the presenting the user the first template video and the target music aggregately in the search result page in the form of card, comprises:
displaying information relevant to the target music in the card, wherein the information relevant to the target music comprises one or more of cover of the target music, name of the target music, singer information corresponding to the target music, the number of video editing templates aggregated according to the target music, and total usage amount of the video editing templates aggregated according to the target music.

7. The method of claim 1, wherein the card further comprises a usage control corresponding to the first editing template used by the first template video, and the method further comprises:

in response to the user's triggering operation on the usage control, jumping to a video editing page, so as to use the first editing template to edit an imported material in the video editing page.

8. The method of claim 1, further comprising:

acquiring a plurality of second template videos in response to the user's triggering operation on a display area in the card corresponding to the target music; wherein the second template video is video edited by using a second editing template, and wherein a music for video editing indicated by the second editing template matches the target music; and jumping from the search result page to an aggregation page corresponding to the target music, wherein the plurality of second template videos are presented in the aggregation page aggregately.

9. An electronic device comprising: a memory and a processor;

wherein the memory is configured to store computer program instructions;

the processor is configured to execute the computer program instructions, to cause the electronic device to implement:

acquiring a search keyword input by a user;

performing matching according to the search keyword to obtain a target music and a first template video that is video edited by using the target music;

wherein the performing matching according to the search keyword to obtain a target music and a first template video that is video edited by using the target music, comprises:

acquiring the target music that matches with the search keyword, acquiring one or more first editing template by perform matching according to the target music, and wherein a music for video editing indicated by the first editing template matches the target music;

for each first editing template, acquiring one or more corresponding first template video from a set of template video obtained by video editing with the first editing template;

presenting a search result page to the user, wherein the one or more first template video and the target music are presented aggregately to the user in the search result page in the form of card, wherein the card comprises an area for presenting the target music and an area for presenting the one or more first template video;

wherein the processor is configured to execute the computer program instructions, to cause the electronic device to further implement:

determining one or more third editing template matching with the search keyword by text matching according to the search keyword;

for each third editing template, acquiring one or more corresponding third template video from a set of template video obtained by video editing with the third editing template; and presenting the one or more third template video in the search result page outside the card.

10. The electronic device of claim 9, wherein the processor is configured to execute the computer program instructions to cause the electronic device to further implement:

when the last first template video is displayed in the card, acquiring a plurality of second template videos matched with the search keyword in response to the user's switching operation on the last first template video; wherein the second template video is video edited by using a second editing template, and wherein the music for video editing indicated by the second editing template matches the target music;

jumping from the search result page to an aggregation page corresponding to the target music, wherein the plurality of second template videos are presented in the aggregation page aggregately.

11. The electronic device of claim 9, wherein the presenting the user the first template video and the target music aggregately in the search result page in the form of card, comprises:

displaying information relevant to the target music in the card, wherein the information relevant to the target music comprises one or more of cover of the target music, name of the target music, singer information corresponding to the target music, the number of video editing templates aggregated according to the target music, and total usage amount of the video editing templates aggregated according to the target music.

12. The electronic device of claim 9, wherein the card further comprises a usage control corresponding to the first editing template used by the first template video, and wherein the processor is configured to execute the computer program instructions to cause the electronic device to further implement:

in response to the user's triggering operation on the usage control, jumping to a video editing page, so as to use the first editing template to edit an imported material in the video editing page.

13. The electronic device of claim 9, wherein the processor is configured to execute the computer program instructions to cause the electronic device to further implement:

acquiring a plurality of second template videos in response to the user's triggering operation on a display area in the card corresponding to the target music; wherein the second template video is video edited by using a second editing template, and wherein a music for video editing indicated by the second editing template matches the target music; and jumping from the search result page to an aggregation page corresponding to the target music, wherein the plurality of second template videos are presented in the aggregation page aggregately.

14. A non-transitory computer readable storage medium comprising: computer program instructions;

wherein an electronic device executes the computer program instructions, to cause the electronic device to implement:

acquiring a search keyword input by a user;

performing matching according to the search keyword to obtain a target music and a first template video that is video edited by using the target music;

wherein the performing matching according to the search keyword to obtain a target music and a first template video that is video edited by using the target music, comprises:

acquiring the target music that matches with the search keyword, acquiring one or more first editing template by perform matching according to the target music, wherein a music for video editing indicated by the first editing template matches the target music;

for each first editing template, acquiring one or more corresponding first template video from a set of template video obtained by video editing with the first editing template;

presenting a search result page to the user, wherein the one or more first template video and the target music are presented aggregately to the user in the search result page in the form of card, wherein the card comprises an area for presenting the target music and an area for presenting the one or more first template video;

wherein an electronic device executes the computer program instructions, to cause the electronic device to further implement:

determining one or more third editing template matching with the search keyword by text matching according to the search keyword;

for each third editing template, acquiring one or more corresponding third template video from a set of template video obtained by video editing with the third editing template; and presenting the one or more third template video in the search result page outside the card.

15. The non-transitory computer readable storage medium of claim 14, wherein the electronic device executes the computer program instructions to further implement:

when the last first template video is displayed in the card, acquiring a plurality of second template videos matched with the search keyword in response to the user's switching operation on the last first template video; wherein the second template video is video edited by using a second editing template, and wherein the music for video editing indicated by the second editing template matches the target music;

jumping from the search result page to an aggregation page corresponding to the target music, wherein the plurality of second template videos are presented in the aggregation page aggregately.

16. The non-transitory computer readable storage medium of claim 14, wherein the card further comprises a usage control corresponding to the first editing template used by the first template video, and wherein the electronic device executes the computer program instructions to further implement:

in response to the user's triggering operation on the usage control, jumping to a video editing page, so as to use the first editing template to edit an imported material in the video editing page.

17. The non-transitory computer readable storage medium of claim 14, wherein the electronic device executes the computer program instructions to further implement:

acquiring a plurality of second template videos in response to the user's triggering operation on a display area in the card corresponding to the target music; wherein the second template video is video edited by using a second editing template, and wherein the music for video editing indicated by the second editing template matches the target music; and jumping from the search result page to an aggregation page corresponding to the target music, wherein the plurality of second template videos are presented in the aggregation page aggregately.

* * * * *